United States Patent [19]

Epstein

[11] Patent Number: 4,794,490
[45] Date of Patent: Dec. 27, 1988

[54] HEAVY-DUTY CABLE TERMINATION SYSTEM

[76] Inventor: Barry M. Epstein, 7523 Cliffbrook, Dallas, Tex. 75240

[21] Appl. No.: 100,186

[22] Filed: Sep. 23, 1987

[51] Int. Cl.$^4$ .......................... H02B 1/20; H04Q 1/14
[52] U.S. Cl. ..................................... 361/428; 361/390; 361/427; 361/420; 174/60; 174/65 K; 379/326
[58] Field of Search ............... 361/334, 346, 353, 355, 361/390, 420, 427, 428, 429; 174/60, 65 R; 379/326, 327

[56] References Cited

U.S. PATENT DOCUMENTS

| | | | |
|---|---|---|---|
| 1,132,672 | 3/1915 | Murray | 361/358 |
| 1,857,197 | 1/1929 | Knoderer | 174/65 R |
| 2,219,887 | 5/1939 | Bowley et al. | 379/327 |
| 2,328,724 | 6/1941 | Johnson et al. | 379/327 |
| 2,355,403 | 8/1942 | Tripp | 174/65 R |
| 2,947,800 | 10/1955 | Badeau et al. | 174/65 R |
| 3,207,955 | 9/1965 | Von Hoorn | 361/346 |
| 3,430,991 | 3/1969 | Otto | 174/65 R |

Primary Examiner—A. D. Pellinen
Assistant Examiner—David A. Osborn
Attorney, Agent, or Firm—Terry M. Gernstein

[57] ABSTRACT

A cable termination assembly includes a heavy duty mounting bracket which is adapted to safely suspend a single or a plurality of heavy cables therefrom or easily and safely terminate a single or a plurality of conduits or pipes to an enclosure. The mounting bracket includes at least one opening that is connected to a free edge of the bracket by a slot. A cable termination device includes a body having a threaded end and a collar thereon. A retaining ring is threadably mounted on the body threaded end and cooperates with the collar to capture the bracket therebetween. A retainer is mounted adjacent to the mounting bracket to engage the cable termination device collar to prevent that collar from rotating as the termination device retaining ring is threadably moved against the mounting bracket. The slot is sized so wires associated with the cable termination device can be moved therethrough.

36 Claims, 4 Drawing Sheets

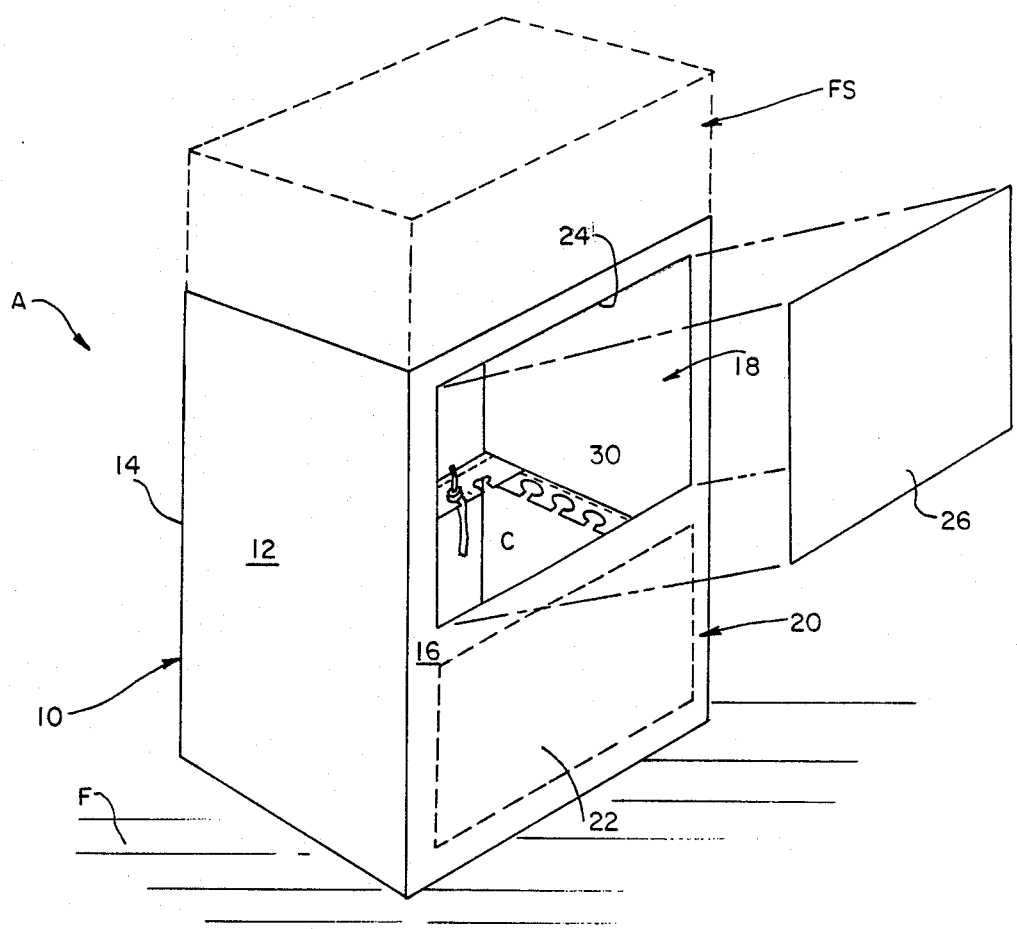
FIG. 1
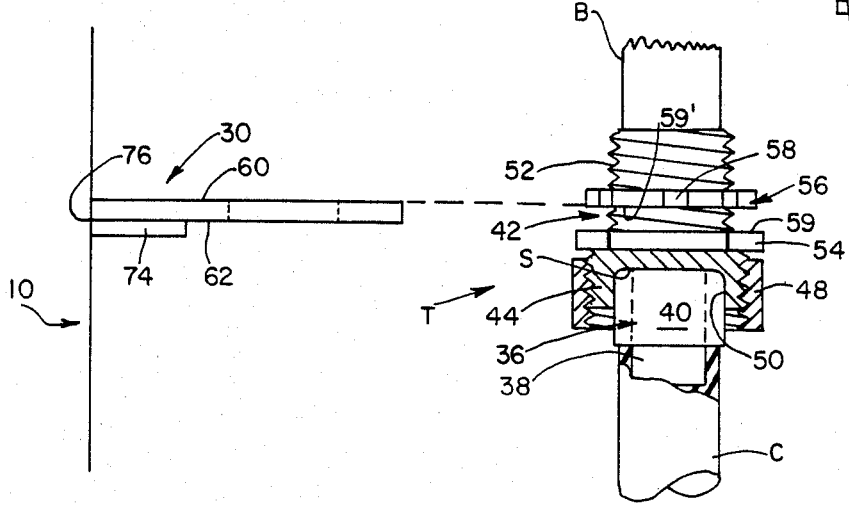
FIG. 2A
FIG. 2

HEAVY-DUTY CABLE TERMINATION SYSTEM

TECHNICAL FIELD

The present invention is related generally to a termination system, and relates in particular to a cable or conduit terminating assembly which permits safe, rapid and secure attachment of a large number of heavy cables or conduits to a heavy duty mounting means.

BACKGROUND OF THE INVENTION

A modern computer room contains many various pieces of equipment. Generally, each one of these pieces of equipment must be individually powered. Often, computer rooms contain a raised (false) floor to facilitate running cables under the floor to each piece of equipment. Even a medium sized computer room may contain ten to forty pieces of equipment, each one requiring a separate circuit.

In conventional wiring systems, the time the electrician spends on site to perform this wiring is very expensive and time consuming. Standard circuit breaker boxes are often wall mounted, and are used in the wiring of the room.

The electrician will remove knock-outs as required in the bottom of the panel and connect either conduit or flexible "seal tight" cables via appropriate fittings. The "seal tight" cables are essentially a flexible conduit armor which can be fitted with a threaded end connection. The threaded end connection is affixed to the breaker panel. Then, a wire is typically run through the conduit. In some cases, a wire is run through the cable first, but no termination device, such as a circuit breaker, may be installed since it would not pass through the knock-out hole. The knock-out and installation process is very time consuming, and may require many man-days of effort.

To reduce this installation time, some users have installed power distribution units. A typical distribution unit may contain a large transformer, controls, and means for terminating the flexible cables. Here too, cable termination can be extremely time consuming. Therefore, many manufacturers deliver the power distribution unit with the intially specified set of cables already installed. This greatly shortens the time required in the field. However, installing additional cables after this initial installation has proved to be cumbersome because of the layout of the power distribution unit. Some units require knock-outs to be made for such future connections. Other units have holes provided, but still, terminating the cables is a very cumbersome job due to the tight space requirements of a typical unit. Still another unit contains a slotted hole so that cable can be passed through with the wiring already inserted in the cable and with a large device such as a circuit breaker already attached to the end of the cable. However, this is still cumbersome and difficult to install because of the cable termination nut must be very tightly installed. To do so often requires two people—one to hold the cable in place with a vise grip or wrench and to be "under" the knock-out or hole, and the other person to tighten down the nut from the top. Because of the space required for the vise grips, it is difficult to space the cable terminations close together. This creates a conflict with the general layout of prior art units, limits the number of possible cables and usually leads to difficult wiring situations which also require considerable floor space work area. In most cases, because of the tight wiring space and the difficulty of holding the cables while terminating, the unit must be shut down. This is usually unacceptable to the data processing operator.

None of the above-mentioned devices is designed to permit quick, yet safe, secure, attachment of a large number of heavy cables to a cable termination assembly. For example, outlet boxes have a confined space and the wires must be manipulated within this space. Thus, not only is there a limit on the number of cables and wires due to this confined space, the attachment of the cables to the circuit breaker box may still be difficult as the wires in the box must held while the cable is attached to the box. Due to such space limitations, such boxes cannot include means for ensuring an attachment of the cable to the box which is safe and secure enough to be acceptable for large cables. Additionally, this may require two workers as discussed above. Still further, the outlet boxes are not easily modified to accommodate a wide variety of cables, especially those cables for which the box was not initially designed.

Still another serious drawback to presently available circuit breaker boxes is that they are not heavy duty. That is, they are not capable of accommodating a large number of cables in a secure manner. Nor are these boxes designed to be strengthened to accommodate such heavy cables. However, due to the above-discussed limitations, even if these boxes could support heavy cables, the space limitations would prohibit use of such cables if there are a large number of wires involved.

Therefore, there is need for a cable termination assembly that permits a cable to have a cable termination device quickly, safely and expeditiously attached, and then permits such cable/cable termination device unit to be quickly and easily mounted in a cable termination assembly frame along with a multiplicity of other such units.

OBJECTS

It is a main object of the present invention to quickly and expeditiously attach each of a plurality of termination devices to a heavy duty termination assembly.

It is another object of the present invention to permit a single worker to quickly and easily attach a termination unit to a heavy duty termination assembly without requiring shutdown of any equipment associated with that cable termination assembly.

It is another object of the present invention to permit a termination assembly to easily accommodate a large number of diverse termination units.

It is another object of the present invention to permit a large number of termination units to be placed close together in a termination assembly.

It is another object of the present invention to eliminate the need for vise grips in the attachment of a cable termination device to the cable termination assembly.

It is another object of the present invention to permit easy and quick field installation of a cable or conduit termination device to a cable or conduit termination assembly.

It is another object of the present invention to eliminate the need for providing a large space beneath or adjacent to the point of attachment of termination devices to a heavy duty bracket of a termination assembly.

It is another object of the present invention to ensure that a cable/cable termination unit is firmly and securely attached to a frame of a cable termination assembly.

It is another object of the present invention to permit easy modification of a cable termination assembly or system without requiring system shutdown.

It is another object of the present invention to permit placement of a cable termination assembly in the most convenient location.

It is another object of the present invention to permit use of safety equipment without need of extra equipment or complex wire paths.

It is another object of the present invention to provide a heavy duty bracket means for securely supporting a plurality of cables in a cable termination assembly.

DISCLOSURE OF THE INVENTION

These and other objects are accomplished by a cable termination assembly which includes a securely mounted, heavy duty mounting bracket having means for quickly, yet securely, attaching cable termination devices thereto. The means includes an opening or a plurality of openings which are each sized to accommodate and mount a cable termination device on a mounting bracket and an entranceway slot connecting each opening to a free edge of the bracket. The means further includes a retainer means located adjacent to each opening and adapted to engage a cable termination device to prevent rotation of that cable termination device with respect to the mounting bracket when the device is being attached to the mounting bracket. It is here noted that the term "cable" used throughout this disclosure is intended to include terms such as "conduit", "pipe", cable, coax, fiber optic bundle or the like and is used here only for the sake of convenience and is not intended to be limiting.

In this manner, the connections can be placed close together, so the required floor space and (multiside) access space are reduced, and easy installation in the field is facilitated. This permits installation to be a one man task which may typically be performed without powering down. Still further, the need for vise grips is eliminated. This is a special advantage as a need for vise grips often requires a second person. In the present invention, the slotted hole arrangement allows a pre-wired cable with a circuit breaker already attached to be positioned. As the cable is put into place, the retainer means holds the bottom nut portion of the cable termination device in position. It then becomes a simple matter to tighten down the top nut of the cable termination device. No vise grip is required underneath. No space is required underneath the mounting bracket, and no difficult maneuvers are required. This greatly reduces and facilitates the time to install cables either in the factory or in the field—both for new and for existing installations. After the cables are put into place, a cover plate for the assembly frame is then positioned to cover any remaining area to provide safety features. Because the retainer means is firmly fixed to the frame of the assembly, the cable is held in place on a heavy duty mounting bracket with substantial force. This eases the installation of the top nut and prevents turning and also ensures secure mounting of heavy cables.

When additional cables are required, it is a simple matter to remove the cover plate, and merely slip the new cables into place. With the present system, this can usually be done without turning off the power, which is quite advantageous to the user. Since a large number of cables can be accommodated in a small area with only front access, the total amount of floor space required is significantly less than in existing devices.

The small space facilitates a clean, open design without complex channels, turns or other necessities between the cable termination point and the circuit breaker attachment. Here too, space is saved and the cable retainer assembly can be raised to a safe, convenient working level for the installing electrician. The filler plate provides necessary safety without requiring baffles or complex wiring paths to avoid a direct open path from the cable termination point to the circuit breakers.

Different size bracket openings are also easily included with matching retainer assemblies to facilitate the use of different size cables.

The present assembly makes it feasible to ship power distribution units without the cables attached, especially since the ends of the cables can be precut to length and circuit breakers can be factory installed on the cable. Field installation consists of the electrician merely guiding the cable through the slot associated with a chosen opening, tightening down the upper nut of the cable termination device (which is usually done by hitting it with a screw driver), and then snapping the circuit breaker in place. Thus, instead of days, a typical field installation takes only a few minutes.

Using the present system, it is also possible to factory-install cables on the cable termination device, but not factory install the cable termination device in a distribution unit. This means that the power distribution unit can be shipped separately from the cable. This greatly adds to shipping convenience. Then, the electrician needs only slip the preassembled assembly into the power conditioner and fasten it. He then snaps the breakers into place. This approach also leads to a very fast field installation and greatly simplifies shipping requirements. The present assembly is also compatible with the use of hard metallic conduits, flexible portable (i.e., rubber or plastic) cords, as well as many other conduits.

DESCRIPTION OF THE FIGURES

FIG. 1 is a perspective view of a cabinet containing the cable termination assembly of the present invention;

FIG. 2 is an elevation view of a cable/cable termination device in relation to a heavy duty bracket of the cable termination assembly of the present invention;

FIG. 2A is a top plan view of a retaining ring associated with a cable termination device.

FIG. 12 is a schematic showing one protection system which can include the cable termination system of the present invention.

DETAILED DESCRIPTION OF THE PREFERRED EMBODIMENTS

Figure 3:
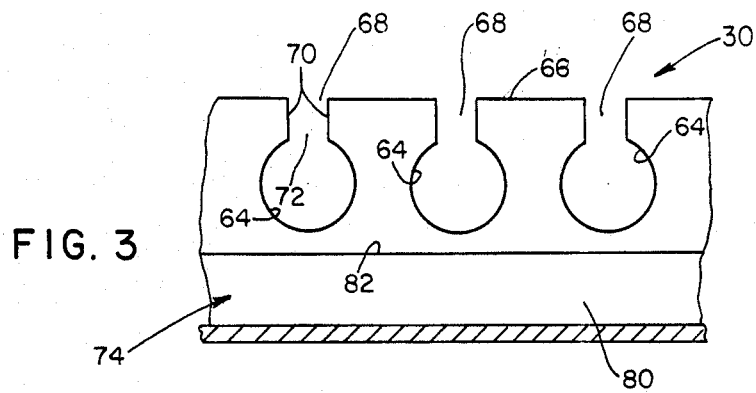
FIG. 3 is a bottom view of the heavy duty bracket of the cable termination assembly with a retaining means thereon.

Shown in FIG. 1 is a cable termination system A for use in a computer room or the like for interconnecting various pieces of equipment. As shown in FIG. 1, the cable termination system includes a cabinet 10 located in any suitable location and including sides 12, rear 14 and a front section 16. The cabinet is divided into a top section 18 and a bottom section 20. The bottom section 20 is covered by a removable panel 22 and the top section 18 includes an access opening 24 which is covered by a removable filler plate 26. As shown, cables, such as cable C are led into the cabinet from beneath floor F via the bottom section 20 of the cabinet. These cables C contain the wires to be used in the computer room equipment and which will be terminated in the assembly and connected to the various pieces of equipment. The cables C are each suspended from a heavy duty bracket 30 which is securely mounted on the cabinet, and are located beneath that bracket in the bottom section 20 of the cabinet.

It is noted that cable termination system A can be used in conjunction with additional systems FS. Examples of such additional systems are sold by Current Technology, Inc. of Dallas, Texas under the Trademarks POWER SIFTOR and POWER SERVER, and can include suitable protection means such as disclosed in U.S. Pat. No. 4,675,772; however, the POWER SIFTOR can be any for of such device as sold by said Current Technology, Inc under the marks PS, PC, PSH and MP, and the like.

As discussed above, the cables are located beneath the floor and are brought into the cabinet via the bottom section 20. Once the cables are connected as required, the cabinet can be closed using the panels 22 and 26, and will be secured as required by safety codes. Should need for variation or modification of the system arise, it is a simple matter to remove these panels and alter the cable termination system as necessary. It is also noted that certain applications will not require the panels 22 and 26.

As best shown in FIG. 2, each cable C is attached to a cable termination device T. If suitable, a device B can be used in conjunction with the cable termination device. The device B can include a circuit breaker, a multi-pin telephone connector, a telephone termination block, a data connector, a device used in conjunction with a fiber optic or coax bles, or the like. The cable termination device T includes a first coupling means 36 having a threaded body section 38 for threadable attachment to the cable and having an end section 40 with a bore extending longitudinally therethrough for receiving the wires associated with the cable. The device T further includes a tubular main body 42 having bore extending longitudinally therethrough, a first threaded end 44 which is sized and adapted to receive the end section 40 of the first coupling means 36, and a nut 48 which is adapted to threadably attach to the main body section threaded end 44 to capture the end section 40 of the first body means within end section 50 of the main body bore.

The main body 42 also includes a second threaded end 52 and a polygonal collar 54. A retaining ring 56 is adapted to threadably attach to the main body second threaded end 52. The retaining ring includes a plurality of projections, such as projection 58 extending radially outward therefrom. The polygonal collar 54 can be hexagonal if suitable, and the two threaded sections of the main body can be of different sizes so that a shoulder S is defined within the longitudinal bore for abutting the first coupling means 36 and holding that means 36 in position within the bore. The polygonal collar 54 includes a top surface 59 which is in confronting relation with a bottom surface 59' of the retaining ring 56 whereby the supporting bracket 30, or other such element, can be captured between the collar 54 and the retaining ring 56 when the retaining ring is threaded down on the main body towards the polygonal collar. Each of the projections 58 on the retaining ring has a surface that can be planar and is adapted to be engaged by a screw driver blade or the like for turning the retaining ring on the main body. The cable is connected to the device T and the wires are located within the bore thereof and extend out of the device T to be connected to suitable connection devices located in the cable termination assembly.

As is best shown in FIG. 2, the cable termination device T is adapted to capture the bracket 30 between the collar 54 and the retaining ring 56 with the retaining ring 56 being located adjacent to top surface 60 of the bracket and the polygonal collar located adjacent to bottom surface 62 of the bracket.

Referring to FIGS. 2 and 3, it is seen that the bracket 30 includes a plurality of openings 64 which are spaced apart from each other along the longitudinal direction of the bracket. Each opening is connected to a free edge 66 of the bracket by a slot 68 having two edges 70 spaced apart to define a gap 72 which is sized according to the size of cable termination device main body size adjacent to the polygonal collar and the retaining ring of the termination device T. The slots are sized so that wires associated with the cable termination device can be moved into the opening via the slot 68 with the cable connected to that termination device and the wires extending therefrom. In this manner, a cable can be easily attached to the bracket as the termination device is the element that is being manipulated and not the wires or the cable. A worker need only hold onto the cable termination device and move that device into position on the bracket, and need not manipulate a plurality of wires or a cable to perform this task. Furthermore, by being sized according to the cable termination device, which is often made of metal, damage to the cable or wires during positioning of the cable on the bracket is avoided as the metal termination device and not the cable or the wires contacts the bracket, which is metal.

As is also shown in FIGS. 2 and 3, a collar retainer means 74 is positioned adjacent to the bracket bottom surface 62. The bracket can be affixed to the cabinet 10 at an edge 76 of the bracket, and the retainer means 74 can be mounted on the bracket or on the cabinet as suitable. The collar retainer means 74 is mounted to be stationary with respect to the bracket, and is adapted to engage the polygonal collar 54 of the cable termination device T. The retainer means 74 engages the polygonal collar and prevents that collar from rotating with respect to the bracket when the termination device is located in an opening 64.

With such engagement, the retaining ring 56 can be threaded down on the termination device main body while the polygonal collar is held stationary against rotation by the retainer means 74. In this manner, the retaining ring 56 is moved towards the polygonal collar to capture the bracket between the stationary collar and the retaining ring. Since the collar is being held by a means that is securely affixed to the stationary assembly, that collar is prevented from rotating by a force that is as secure as the assembly itself. In this manner, the collar is held as securely as possible, and the retaining ring can be threaded down as tightly as possible. The holding function is performed automatically by the retainer means 74, and thus vise grips need not be applied to the collar by anyone. The holding function is carried out by the retainer means better than any worker using vise grips located beneath the bracket, and performs this holding function without need of a second pair of hands whereby one worker can connect the termination device T to the bracket. In fact, due to the automatic and secure nature of the holding function of the retainer means 74, such holding function is performed better than if another worker using vise grips carried out such function.

Since the retainer means 74 carries out the holding function, there is no need to provide space beneath the bracket for locating vise grips, and the area adjacent to the bracket 30 is utilized in an efficient manner. Since the termination device T is securely held automatically, the cables can be easily and securely attached to the bracket and can be located close together thereby further utilizing space in an efficient manner. Since little manipulation is needed, adding new cables to an already loaded bracket is an easy task so variation of a system associated with the assembly A as also an easy task.

The retainer means 74 shown in FIGS. 2 and 3 includes a bar 80 extending longitudinally of the bracket and having one longitudinal edge abutting the cabinet and another longitudinal edge 82 located adjacent to the openings 64. The edge 82 abuts the flats of the polygonal collar and prevents rotation of that collar when the termination device is located in the opening 64.

It is also noted that a cable temination device used in conjunction with fiber optic cables, coax, etc, may be changed from the above-discussed device. However, based on the present disclosure, those skilled in the art will understand how such changes are to be effected, and the teachings of the present disclosure will still apply regarding the brackets, slots, openings, collars and collar retaining means, and the like. Accordingly, for the sake of brevity, such alternative embodiments will not be discussed.

Figure 4:
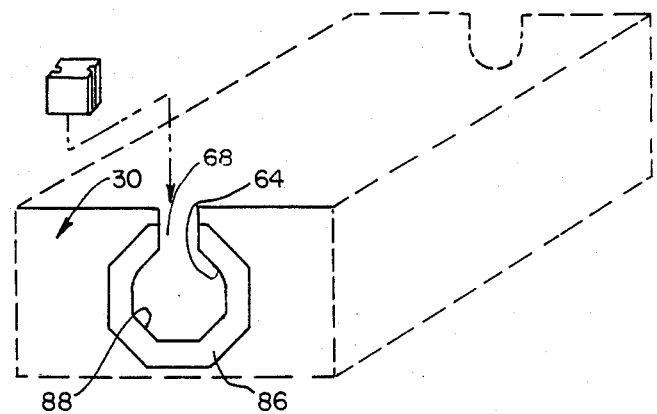
FIG. 4 is a perspective of a receptacle box with a heavy duty bracket of the cable termination assembly of the present invention having an alternative retaining means thereon.

Another form of the retainer means is shown in FIG. 4 on a single termination receptacle box R, and includes a polygonal element 86 attached to the bracket adjacent to each opening to capture a termination device polygonal collar when the termination device is accommodated in the opening. The element 86 has an open section 88 through which the termination device collar passes, and acts like a gripping device in engaging that collar to prevent rotation of the termination device collar with respect to the bracket once that device is positioned in the opening in a desired manner. A slip-in tab 89 can be used to block slot 68 as necessary.

Other forms of the retainer means can be used, and will occur to one skilled in the art based on the present disclosure. The retainer means only needs to engage the polygonal collar of the cable termination device and automatically prevent rotation of that collar when the termination device is properly located in the opening of the bracket. Accordingly, the disclosure of the bar 74 and the polygonal element 86 is intended to be exemplary only and is not intended to be limiting.

Figure 5:
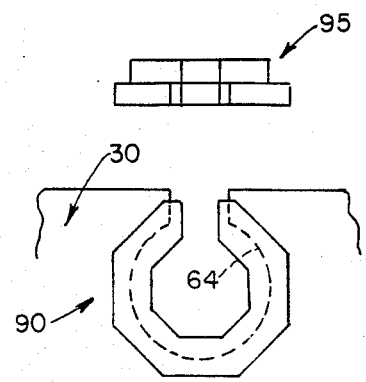
FIG. 5 shows yet another form of a retaining means for use in a cable termination assembly.
Figure 6:
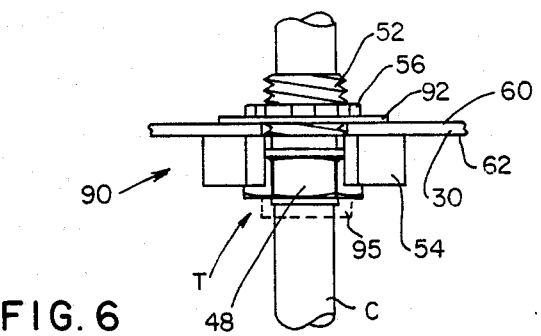
FIG. 6 is an elevation view of the FIG. 5 adapter element positioned on a bracket for use in the cable termination assembly of the present invention.

The bracket can include a multiplicity of openings of various sizes to accommodate cable of various sizes. However, a situation may arise in which a small cable is to be attached to the bracket and only large openings are available. Accordingly, the assembly 10 includes means for modifying the size of an opening to accommodate a cable termination device that is smaller than an opening. Such modifying means is indicated in FIGS. 5–8. FIG. 5 and 6 show a modifying means or adapter 90 that includes a polygonal adapter element. The polygonal adapter element is sized to snugly engage the small termination device collar and is mounted on the bracket adjacent to the opening through which the small termination device is to be passed. The polygonal adapter 90 is used in conjunction with a washer 92, or other such element affixed to the termination device adjacent to the retaining ring of that termination device. The washer 92 is adapted to engage the top surface of the bracket to prevent the small termination device from slipping through the large opening. The washer is forced against the bracket by the retaining ring and, together with the adaptor 90, securely holds the small termination device in the large opening. The washer can be adapted to fit over the small termination device and be located adjacent to the retainer ring, or can be split to have a slot through which the cable wires can pass and be adapted to be mounted on the bracket adjacent to the large opening. Additional washers can be used and mounted as required to ensure that a small unit is properly mounted and retained on the bracket adjacent to a large opening.

The adapter 90 can include a polygonal nut threadably mounted on the small termination device between the polygonal collar of that small termination device and the retaining ring of that small termination device. Such nut then cooperates with the retainer means associated with the large opening in the manner of the polygonal collar. A further washer 95 can be affixed to the top of the adapter 90 to prevent the hex part of the assembly T from passing through the washer. The washer is slotted and has an outer diameter less than the diameter of hole 64 and an inner diameter as nedded for the desired small cable.

Figure 7:
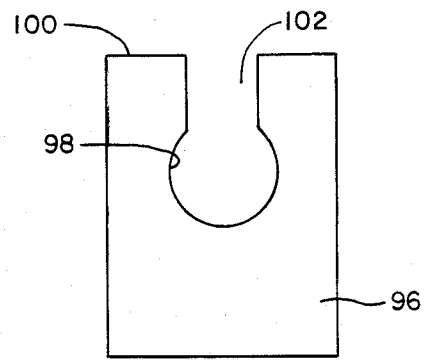
FIG. 7 shows yet another form of an adapter for use in a cable termination assembly.
Figure 8:
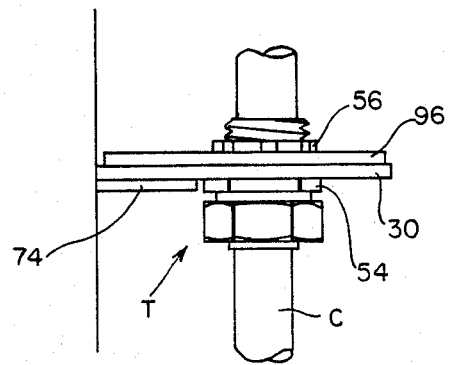
FIG. 8 is an elevation view of the FIG. 7 adapter mounted on a bracket.

FIGS. 7 and 8 show another form of the modifying means. The modifying means shown in FIGS. 7 and 8 includes an adapter plate 96 having an opening 98 defined therein. The opening 98 is sized to snugly accommodate wires associated with the small termination device, and is connected to a free edge 100 of the plate by a slot 102 which is sized to accommodate the small termination device in the manner described above with respect to the slots 68. The adapter plate 96 is mounted on the bracket so the small opening 98 coincides with the large opening 64 in the bracket. The small termination device is supported by the adapter plate, and a further modifying device, such as the device 90 shown in FIG. 6, can be used to engage the polygonal collar of the small termination device. The previously-described system may also be used in toto on adapter plate 96 if desired.

Figure 9:
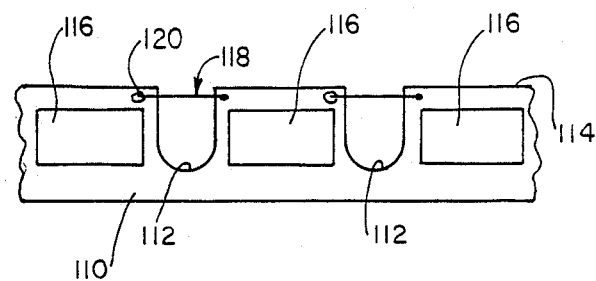
FIG. 9 is a bottom view of another form of the heavy duty bracket used in the cable termination assembly of the present invention.

A further modification of the cable termination assembly is shown in FIG. 9. This modification includes a bracket 110 mounted on the cabinet in a manner similar to that of the bracket 30. The bracket 110 includes a plurality of elongated openings 112 which are shaped to accommodate the cable termination devices and to be in contact with free edge 114 of the bracket 110. Thus, a cable termination device will fit directly into an opening 112 rather than moving through a slot as in the above embodiments of the assembly. A retainer bar 116 is mounted on the underside of the bracket adjacent to each side of each opening 112 in a position to engage the flats of the polygonal collar of a cable termination device. A capture device 118 is adapted to be releasably attached to the bracket adjacent to each opening to capture a cable termination device in the opening. Such capture device can include a wirelike means attached at one end to the bracket and having the other end thereof adapted to be releasably engaged with an anchor 120 after the cable termination device is positioned in the opening 112.

Figure 10:
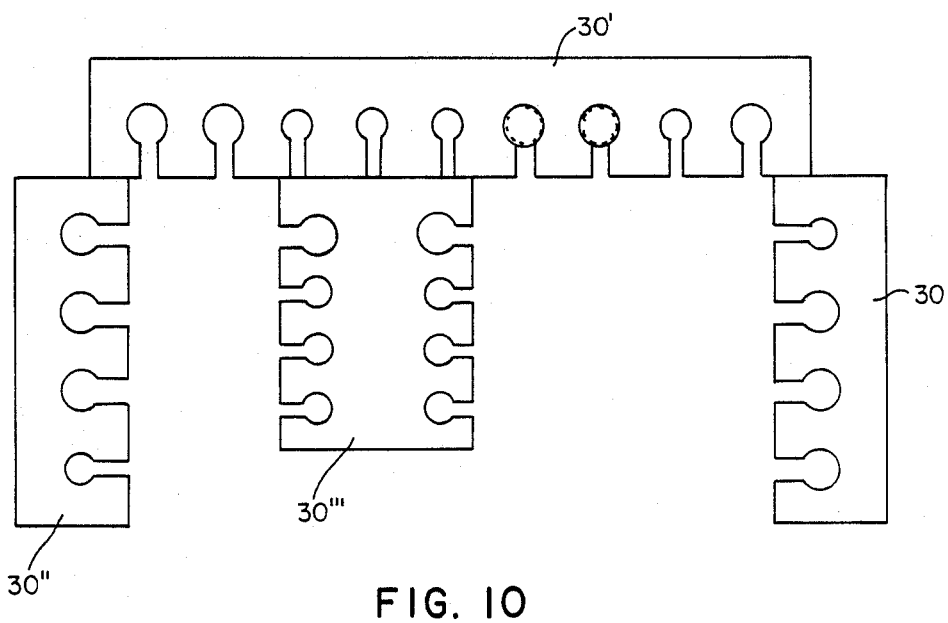
FIG. 10 is a top perspective view of several heavy duty bracket used in the cable termination assembly of the present invention.
Figure 11:
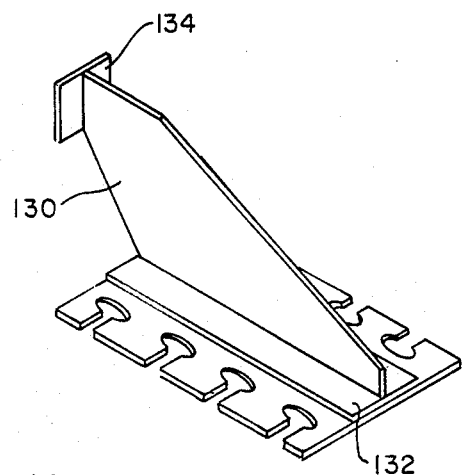
FIG. 11 is a bottom perspective of one of the FIG. 10 heavy duty brackets.

The bracket associated with the cable termination assembly A is a heavy duty bracket capable of securely supporting a multiplicity of heavy cables. This bracket is best shown in FIGS. 10 and 11, and attention is now directed to such figures. As shown in FIG. 10, the assembly can include a plurality of brackets arranged in a plurality of U shaped configurations. Thus, as shown in FIG. 10, the assembly A can include a second bracket 30' located adjacent to the back of the cabinet, a first side bracket 30" located adjacent to one side of the cabinet, and a third bracket 30''' located within the cabinet. Each of the brackets can have a plurality of different openings defined therein and each is capable of securely supporting a multiplicity of large cables thereon. In this manner, a large number of cables can be securely supported by the assembly A. As shown in FIG. 10, the third bracket 30''' can include two sets of openings, one set arranged along one longitudinal edge thereof, and another set arranged along another longitudinal edge thereof. A further bracket can be located adjacent to another side of the cabinet, and still another bracket can be located adjacent to the rear of the cabinet adjacent to the bracket 30' shown in Figure. As indicated in FIG. 10, the bracket 30''' can be added to an assembly that includes a U shaped configuration to form two U-shaped configurations. In this manner, additional openings of various sizes can be added to an assembly thereby making the assembly quite adaptable to a wide variety of uses.

As best shown in FIG. 11, the various brackets are supported on the cabinet at one edge thereof, and can include a further support means to ensure that the bracket is capable of supporting a multiplicity of heavy cables in a safe, secure manner. The further support means is shown in FIG. 11 as including a triangular support bracket 130 having one leg thereof securely mounted on the cabinet and one leg thereof supporting the brackets 30—30'''. The support brackets can be any shape, just so they support the brackets 30—30''' in a secure manner. The support brackets 130 can include a flange 132 located to engage the underside of the brackets 30—30''' to further ensure secure support for those brackets. The flange can serve a dual purpose of acting as the retainer means discussed above (for example, the flange 130 can function as the retainer bar 80 in addition to functioning as an additional support for the bracket). Yet another flange 134 is affixable to the cabinet.

The method of using the assembly A is evident from the above description, and thus will not be discussed in detail. It is only noted that the cable termination device is easily mounted on the cable, and then is easily and securely mounted on the bracket by simply sliding the cable terminating device through the slot into the opening of the bracket, and then threading the retaining ring down against the bracket. The retainer means will automatically engage the collar of the cable terminating device and prevent that collar from rotating as the retaining ring is threaded down. The secure nature of the attachment of the retainer means ensures that the cable terminating device collar will be securely held. This ensures that the cable terminating device will be attached to the bracket firmly enough to securely support even heavy cables. The secure nature of the support for the bracket ensures that a multiplicity of heavy cables can be securely supported in the assembly. The nature of the assembly further permits the assembly to be easily and quickly adapted to a wide variety of different cables and cable sizes.

The above-discussed termination system can be used in large, floor-mounted units such as shown in FIG. 1, or can be used in small, portable units such as sold under the mark PS Series by Current Technology, Inc of Dallas, Tex. This is indicated in FIG. 12 for a PS Series unit 150 connected between a circuit breaker panel 152 and a load 154 to be protected. As shown in FIG. 12, the unit 150 includes a cable termination assembly 156 mounted on an end 158 thereof. The cable termination assembly 156 includes the bracket 30 which is as above described. The unit 150 can be adapted to accommodate single or multiple cables, such as cables C and C', and the multiple-cable form is shown as including a plurality of different size holes 64 for accommodating different size cable termination devices as above discussed. Built-in receptacles 160 can also be included on the unit 150, and a cover plate, not shown in FIG. 12, can be used to cover the holes 64 if they are not being used. The above-discussed devices can be used as or in modifications to or replacements of standard knock-out holes or connections holes in various electrical applications sucha as, but not limited to, current breaker boxes, J-boxes, utility enclosures, ovens, ranges, lights, fans, various telephone boxes and accessories where multi-pair termination strips are used, blocks, plugs, or receptacles which have been previuosly installed, data communication applications with coaxial cable, single conductor-to-multiple conductor pairs, fiber optic cables and terminations, LAN's, security enclosures, and the like. The devices are also useful in applications with equipment having functions such as electronic filtering, power conditioning, surge suppression,control of industrial electronics, telephone and communication systems, high vibration mobile or airborne systems, terminations, and the like.

The foregoing disclosure is intended to be an example only, and is not intended to be limiting, and could be used on other difficult terminations. It is intended that the invention is to include all embodiments and variations as will occur to one skilled in the art from the present disclosure and embraced by the appended claims.

I claim:

1. A cable termination assembly for use with a cable termination device that includes a body having a threaded end and a collar, a first coupling means removably attached to a cable and releasably attached to the body and a retaining ring threadably attached to the body threaded end, the body being tubular with a bore extending therethrough, the assembly comprising:

a cabinet;

a mounting bracket on said cabinet having a top surface and an undersurface with an opening defined therethrough with said opening being sized and adapted to removably receive a threaded portion of a body of a cable termination device to position a collar of the cable termination device adjacent to said mounting bracket undersurface with the body threaded portion of that cable termination device extending through said mounting bracket via said opening so that a retaining ring of the cable termination device will be located adjacent to the top surface with the mounting bracket being positioned between the retaining ring and the collar of the cable termination device for mounting the cable termination device on said mounting bracket;

a slot extending from one edge of the mounting bracket to said opening and having a size that is large enough so wires associated with the cable termination device can be moved through said slot and small enough so the cable termination device retaining ring is prevented from passing through said slot so that the cable termination device can be moved through said slot into said opening to position that cable termination device and the wires associated therewith with respect to said mounting bracket; and a collar retainer means located adjacent to the mounting bracket undersurface next to said opening to engage the cable termination device collar when such cable termination device is positioned in said opening and adapted to prevent that engaged cable termination device from rotating while the retaining ring of that cable termination device is being threaded down on the cable termination device body threaded portion against the mounting bracket top surface.

2. The assembly defined in claim 1 wherein said collar retainer means includes a bar mounted adjacent to said mounting bracket undersurface.

3. The assembly defined in claim 1 wherein said collar retainer means is shaped and sized to capture the cable termination device collar therein and at least partially surround that device collar.

4. The assembly defined in claim 3 wherein the cable termination device collar and said collar retainer means are both polygonally shaped.

5. The assembly defined in claim 3 wherein the cable termination device collar and said collar retainer means are both hexagonally shaped.

6. The assembly defined in claim 1 wherein the cable termination device retaining ring includes a plurality of projections thereon.

7. The assembly defined in claim 1 further including a second mounting bracket on said cabinet located adjacent to said mounting bracket.

8. The assembly defined in claim 1 wherein said mounting bracket includes a support bracket attached to said mounting bracket undersurface.

9. The assembly defined in claim 7 further including a first side mounting bracket on said cabinet and spaced from said mounting bracket and being located adjacent to said second mounting bracket so that said mounting brackets form a U-shaped configuration.

10. The assembly defined in claim 9 wherein said U-shaped configuration includes support brackets on all of said mounting brackets.

11. The assembly defined in claim 10 wherein said third mounting bracket includes a plurality of rows of openings.

12. The assembly defined in claim 1 further including a circuit breaker.

13. The assembly defined in claim 1 further including an adapter means mounted adjacent to said mounting bracket to be located next to said opening, said adapter means including an adapter opening having a size smaller than said mounting bracket opening and being centrally aligned with such mounting bracket opening whereby said adapter opening overlaps said mounting bracket opening.

14. The assembly defined in claim 13 wherein said adapter opening has a shape which is similar to the shape of said cable terminating device collar.

15. The assembly defined in claim 14 wherein said adapter opening and said cable terminating device collar are both polygonal in shape.

16. The assembly defined in claim 1 further including a bottom adapter mounted on said mounting bracket undersurface and having a threaded portion sized and adapted to threadably engage the cable terminating device body threaded end.

17. The assembly defined in claim 1 further including a plurality of openings defined through said mounting bracket with each opening having an associated slot extending therefrom to the free edge of said mounting bracket.

18. The assembly defined in claim 17 wherein said plurality of openings are arranged in at least one row.

19. The assembly defined in claim 17 wherein said plurality of openings are arranged in a plurality of rows.

20. The assembly defined in claim 17 wherein said plurality of openings have a plurality of sizes.

21. The assembly defined in claim 1 wherein said retainer means is affixed to said frame.

22. The assembly defined in claim 1 wherein said retainer means is affixed to said mounting bracket.

23. The improvement defined in claim 1 further including telephone connections.

24. The improvement defined in claim 1 further including a telephone termination block.

25. The improvement defined in claim 1 further including a data connector.

26. The improvement defined in claim 1 further including a multi-pin telephone connector.

27. In a cable termination assembly used with a cable termination device having a body which includes a threaded end and a collar, a first coupling means removably attached to a cable and releasably attached to the body and a retaining ring threadably attachable to the body threaded end, the improvement in combination therewith comprising:

a mounting bracket to which the cable termination device is releasably mounted, said mounting bracket having a free edge and an entranceway slot means extending from said bracket free edge to a cable termination device accommodating means in said mounting bracket through which the cable termination device passes when that cable termination device is being attached to said mounting bracket, said slot means having a size that is large enough so wires associated with the cable termination device can move through the slot means and small enough so the cable termination device retaining ring cannot pass through the slot means; and retainer means mounted adjacent to the mounting bracket cable termination device accommodating means for preventing rotation of the cable termination device with respect to the bracket while the cable termination device is being attached to said bracket.

28. The improvement defined in claim 27 wherein said mounting bracket cable termination device accommodating means includes an opening defined in said mounting bracket.

29. The improvement defined in claim 32 further including a plurality of openings in said mounting bracket each having an entranceway slot connecting it with said mounting bracket free edge.

30. The improvement defined in claim 27 in which said retainer means includes an elongated bar.

31. The improvement defined in claim 27 in which said retainer means includes an abutment means having a shape similar to the shape of the cable termination device collar.

32. The improvement defined in claim 29 wherein a plurality of cables are mounted on said mounting bracket.

33. The improvement defined in claim 27 wherein said retainer means includes first and second abutment plates mounted on said mounting bracket.

34. The improvement defined in claim 33 in which the cable termination device accommodating means is located between said abutment plates.

35. The improvement defined in claim 34 in which said cable termination device accommodating means includes an opening having a size essentially equal to the size of the cable termination device body and slightly smaller than the cable termination device collar.

36. The improvement defined in claim 34 further including a capturing means mounted on said mounting bracket for spanning the bracket opening and capturing the cable termination device in said mounting bracket opening.

* * * * *